United States Patent
Kropinski et al.

(10) Patent No.: US 7,403,101 B2
(45) Date of Patent: Jul. 22, 2008

(54) COLLISION AVOIDANCE OF UNATTENDED VEHICLES

(75) Inventors: Michael A. Kropinski, Troy, MI (US); Thomas E. Bolander, Flint, MI (US); Alexander N. Makris, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 183 days.

(21) Appl. No.: 11/054,240

(22) Filed: Feb. 9, 2005

(65) Prior Publication Data

US 2006/0187009 A1    Aug. 24, 2006

(51) Int. Cl.
*B60Q 1/00* (2006.01)

(52) U.S. Cl. .................. 340/435; 340/901; 340/903; 340/425.5

(58) Field of Classification Search .......... 340/435, 340/901, 903, 904, 425.5, 426.6, 436
See application file for complete search history.

(56) References Cited

U.S. PATENT DOCUMENTS

| 4,987,402 A | * | 1/1991 | Nykerk | ................. 704/274 |
| 5,357,560 A | * | 10/1994 | Nykerk | ................. 455/404.1 |

* cited by examiner

*Primary Examiner*—Daryl C Pope

(57) ABSTRACT

Methods and apparatus are provided for protecting an unattended parked vehicle from being impacted by a moving vehicle under control of a driver. The apparatus comprises a detection and alarm system built into the unattended parked vehicle. When a moving vehicle comes within a predetermined distance from the unattended parked vehicle, the apparatus senses the presence of the moving vehicle and activates the alarm system. If the moving vehicle continues to approach the unattended parked vehicle, the activated alarm signals are increased in intensity. Typically, the alarm signals would be in the form of lights flashing and/or horn blowing, or any appropriate combination of audible and visual signals.

26 Claims, 3 Drawing Sheets

COLLISION AVOIDANCE OF UNATTENDED VEHICLES

TECHNICAL FIELD

The present invention generally relates to distance detectors on vehicles, and more particularly relates to ultrasonic distance detectors on unattended parked vehicles.

BACKGROUND

Minor collisions between moving vehicles and unattended parked vehicles are common occurrences in areas such as parking lots. While the damage from this type of collision is not usually extensive, since the moving vehicle is usually maneuvering slowly into or out of a parking space, even a minor collision can prove to be an unpleasant and costly experience for the owner of the parked vehicle, as well as for the driver of the moving vehicle. Moreover, as the vehicle population increases, and as the variations in vehicle size and shape increase as well, the potential for collisions of this type is also likely to increase.

Recent developments in automotive technology involve the use of ultrasonic distance detectors installed on a vehicle. Typically, the purpose of this type of distance detector is to warn the driver of an impending contact with another object. For example, ultrasonic sensors can be placed on the bumpers and sides of a vehicle to enable the determination of distances between the vehicle sensors and another object, such as a parked car or a tree. When a detector-equipped vehicle is within a predetermined distance from an object, an alarm can be activated to warn the driver of the situation. As such, the driver of an appropriately equipped vehicle can be alerted in time to avoid a collision with a nearby object.

In general, however, such distance detection systems are only active when a vehicle is being driven, and are typically placed in an off state when the vehicle ignition is turned off, as in a parking situation. In addition, most automotive vehicles are not yet equipped with distance detection systems, so there is usually no type of active warning system in place for the kind of situation where an unequipped vehicle is maneuvering in the proximity of parked vehicles.

Even if a parked vehicle is equipped with a distance detection system, the sensing process will be typically inactive, since the system is normally turned off when the vehicle is parked. Therefore, it is desirable to incorporate a type of detection system in a parked unattended vehicle that can be operative after the ignition is turned off, to warn an approaching driver of the possibility of an impending collision.

Accordingly, it is desirable to provide a collision avoidance system for a vehicle that can be operative when the vehicle is in a parked (ignition off) state. In addition, it is desirable to implement this type of collision avoidance system with available technology and hardware, to minimize manufacturing production costs. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for protecting an unattended parked vehicle from being impacted by a moving vehicle under the control of a driver. One device comprises a collision avoidance system installed within the unattended parked vehicle. The exemplary collision avoidance system typically includes distance sensing apparatus and a processor controlled alarm system. One or more distance boundaries are predetermined around the unattended parked vehicle, based on the type and configuration of the distance sensing apparatus. If a moving vehicle enters within a distance boundary, the alarm system can be activated. Typically, the alarm system provides increasingly intense visual and/or audible alarm signals as the moving vehicle crosses the predetermined distance boundaries while approaching the unattended parked vehicle.

A first level warning signal may be in the form of turning on the lights of the unattended parked vehicle. A second level warning signal may be in the form of flashing the lights, or increasing their intensity. A third level warning signal may add a horn blowing in addition to the flashing lights, and so on.

The exemplary collision avoidance system is typically configured with a processor and an ultrasonic distance sensing apparatus that can discriminate between a moving object and a stationary one, and can also determine which moving object is closest to the unattended parked vehicle. The exemplary collision avoidance system is typically powered by the main battery, or by an auxiliary battery, in the unattended parked vehicle. The exemplary collision avoidance system is typically placed in a standby mode initially, to conserve battery power, and then activated to full power when a moving vehicle is detected within a distance boundary.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of collision avoidance systems embedded in unattended parked vehicles. An exemplary system of this type is typically configured to remain operative after the vehicle ignition system has been turned off. The exemplary collision avoidance system is generally configured to detect the presence of a moving vehicle within one or more predetermined distances from an unattended parked vehicle. The exemplary collision avoidance system can then activate one or more types of alarms to warn the approaching vehicle of an impending collision.

Figure 1:
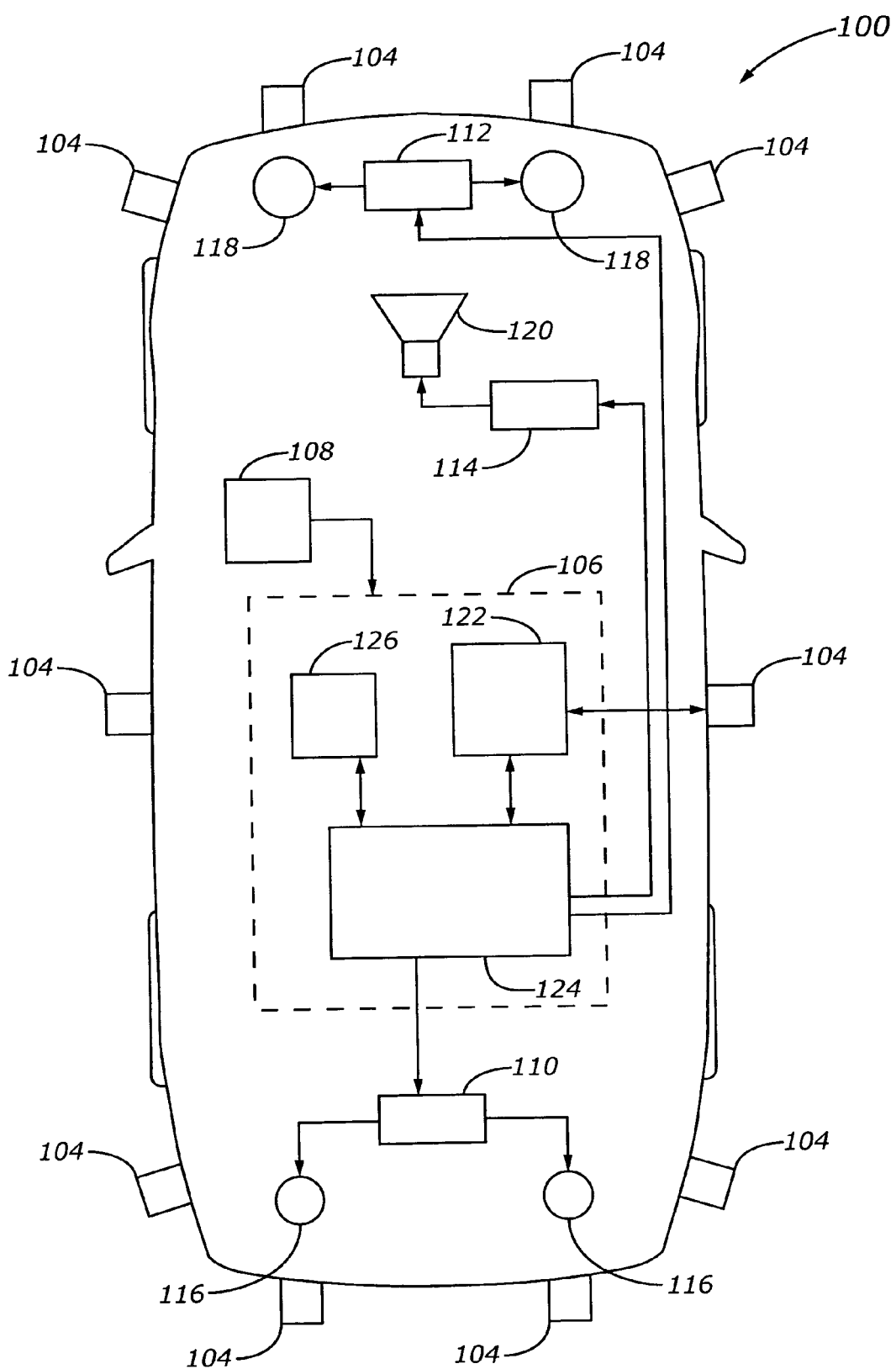
FIG. 1 is a block diagram of an exemplary vehicle collision avoidance system.

According to an exemplary embodiment of a collision avoidance system 100 for an unattended parked vehicle 102, as shown in block diagram form in FIG. 1, a number of distance sensors 104 are typically positioned at strategic locations around the perimeter of vehicle 102. Each sensor 104 is suitably coupled to a controller 106, which receives power from a power source 108 when vehicle 102 is parked with the ignition system turned off. Power source 108 is typically the main vehicle battery, but may also be any appropriate type of auxiliary power source. Various alarm actuators 110, 112, 114 are suitably coupled to controller 106, and are used to activate warning indicators, such as tail lights 116, headlights 118, and horn 120, respectively, or any appropriate combination of visual and/or audible signals.

Sensors 104 may be any type of distance detection sensor that is appropriate for use on an automotive vehicle. One type of appropriate distance detection sensor is configured as an ultrasonic device. In order for an ultrasonic device to function as a distance detector, it is generally coupled to an ultrasonic transmitter/receiver (T/R) device 122, which is shown in this embodiment as being incorporated into controller 106, although other embodiments may also be used. T/R device 122 is typically configured to transmit ultrasonic pulses via sensors 104, and to receive any return pulses from sensors 104 that may be reflected from an external object, such as a moving vehicle. A processor 124 is also typically incorporated into controller 106, in conjunction with a memory 126. Processor 124 is typically configured to calculate the distance from any sensor 104 to an external object, and to determine whether or not the external object is changing position, based on the elapsed time between transmission and reflected reception of ultrasonic pulses from a sensor 104.

As will be described in greater detail below, the exemplary method and device recognizes when a moving object is within a predetermined distance boundary with respect to vehicle 102. When this occurs, processor 124 is typically enabled to activate one or more of alarm actuators 110, 112, 114, in order to warn an approaching driver of a possible collision with vehicle 102.

Figure 2:
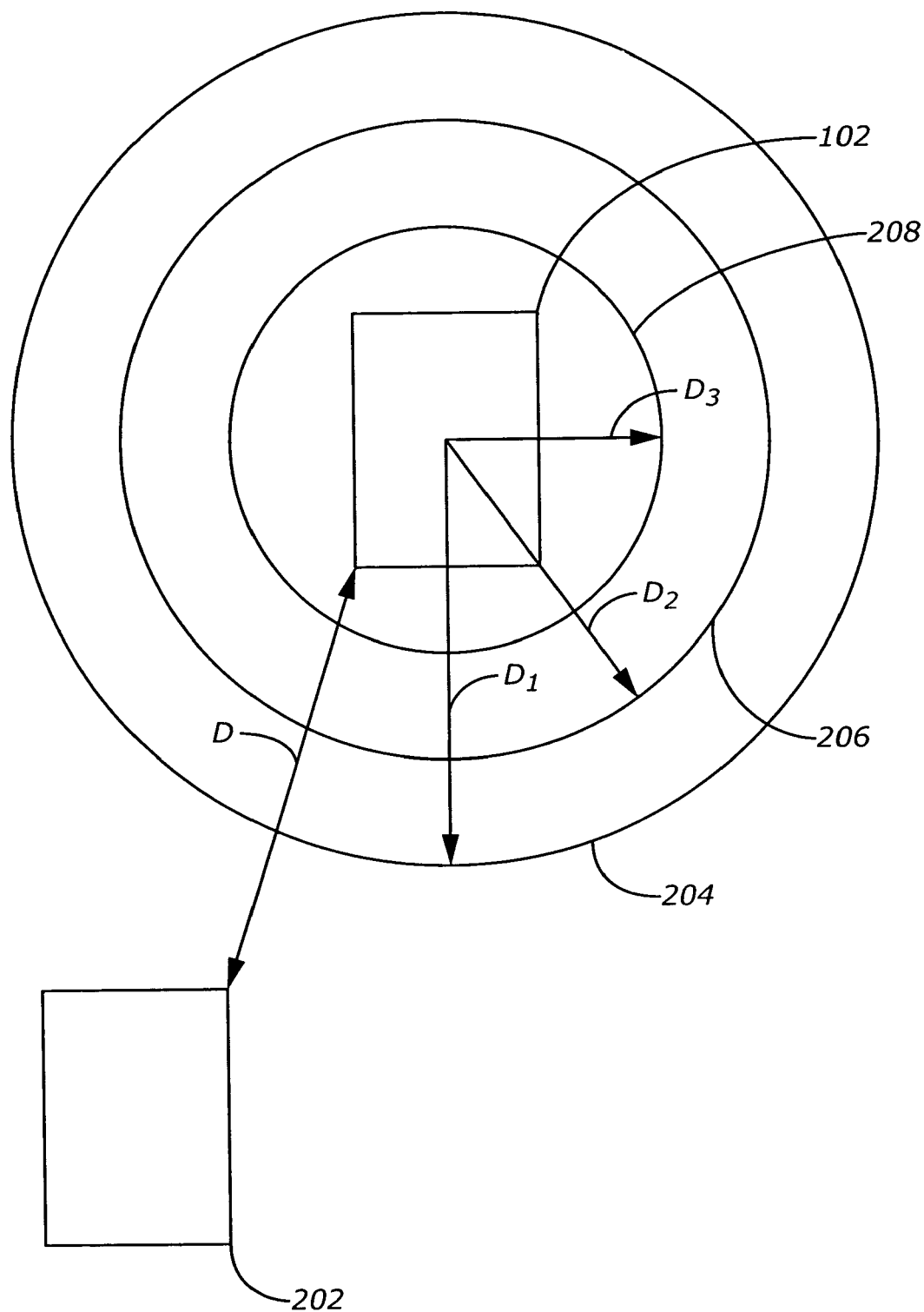
FIG. 2 is an illustration of an exemplary boundary diagram for a vehicle collision avoidance system.

According to the exemplary embodiment, as depicted in FIG. 2, vehicle 102 is shown in a parked position, at a distance D from a moving object, such as a vehicle, 202. Concentric boundary lines 204, 206, 208 represent typical predetermined warning distance radii $D_1$, $D_2$, $D_3$, respectively, from vehicle 102. For example, $D_1$ might be approximately 3 feet, $D_2$ might be approximately 2 feet, and $D_3$ might be approximately 1 foot. The exemplary collision avoidance system 100 is typically configured so that if object 202 moves within the first boundary 204, a first level of warning is typically activated. If object 202 moves within the second boundary 206, a second level of warning is typically activated, and if object 202 moves within the third boundary 208, a third level of warning is typically activated.

Exemplary collision avoidance system 100 is typically configured to distinguish between a stationary object, such as a parking meter or a parked vehicle, and a moving object, such as vehicle 202, that is within a distance boundary. In addition, collision avoidance system 100 is typically configured to limit the time duration of a warning alarm signal, to avoid becoming a public nuisance, and also to conserve battery power. Moreover, system 100 can generally discriminate between multiple sensor 104 input signals to determine which sensor 104 signal represents the closest distance between vehicle 202 and vehicle 102. Optionally, system 100 may be activated or turned off by a remote signal from outside vehicle 102, as well as from a manual or automatic control within vehicle 102.

As previously noted, any appropriate type of visual and/or audible warning alarms may be activated by processor 124 via alarm actuators 110, 112, 114 when a moving object, such as vehicle 202, appears within a predetermined distance boundary (204, 206, 208). For example, a first level warning might typically be in the form of turning on tail lights 116 and/or headlights 118 when vehicle 202 moves within distance boundary 204. A second level warning might typically take the form of intermittently flashing lights 116 and/or 118 when vehicle 202 moves within distance boundary 206. Similarly, a third level warning might typically activate horn 120 in addition to flashing lights 116 and/or 118 when vehicle 202 moves within distance boundary 208. Alternate embodiments of increasing levels of warning signals might include an increase in light intensity as a moving vehicle crosses successively closer distance boundaries, or an increase in the light flashing rate, or blowing the horn intermittently, for example.

Figure 3:
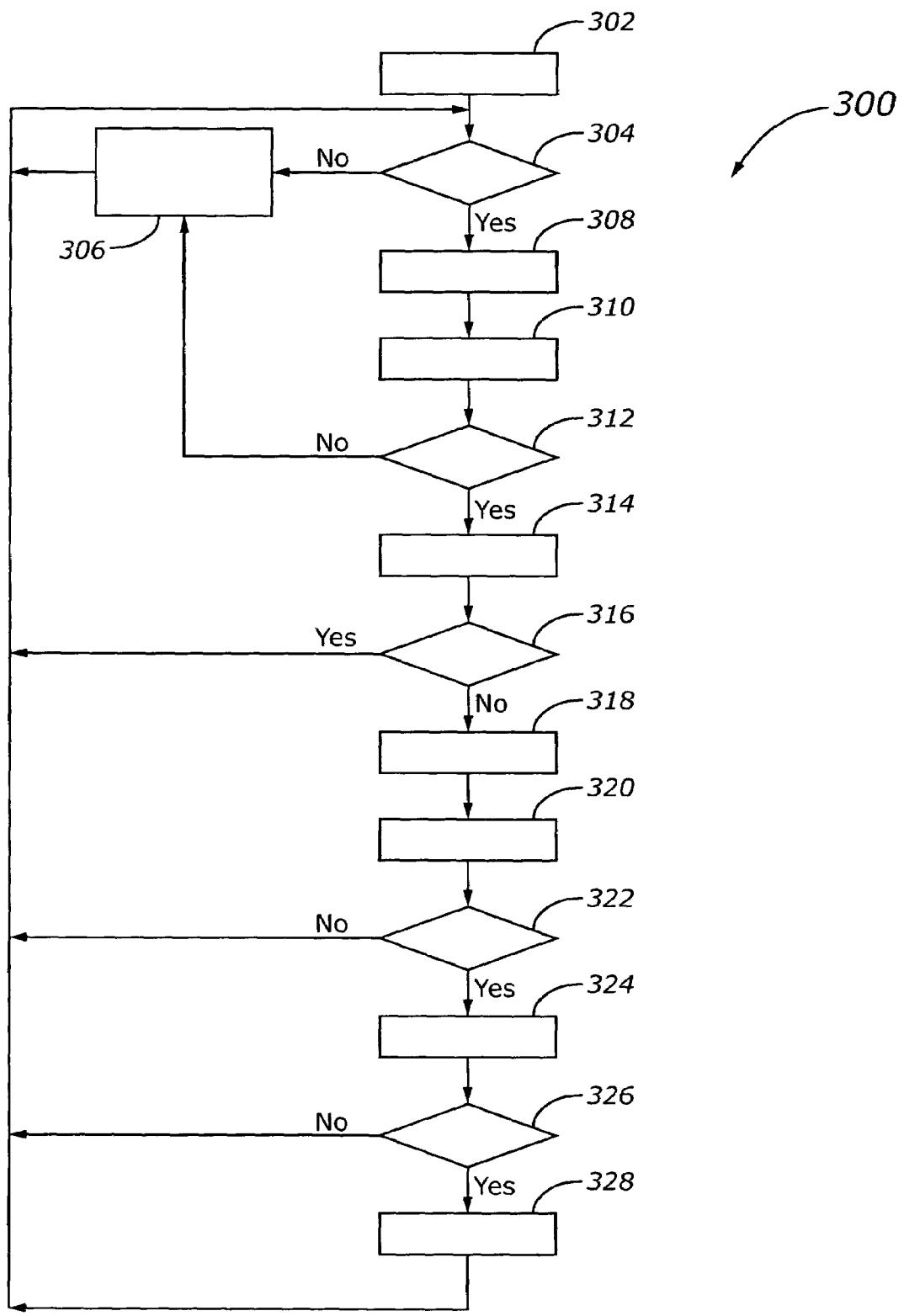
FIG. 3 is a flow diagram of an exemplary method for implementing a vehicle collision avoidance system.

A typical operational sequence of exemplary collision avoidance system 100 can be represented by a system flow diagram 300, as depicted in FIG. 3. A first step 302 is generally the initialization of collision avoidance system 100, including the various parameters and algorithms stored in memory 126 of processor 124. For example, predetermined warning distance radii $D_1$, $D_2$, $D_3$ are typically stored in memory 126, along with their corresponding alarm levels and/or alarm combinations. In addition, distance boundaries 204, 206, 208 are typically established in accordance with the particular configuration and operating characteristics of sensors 104 and T/R 122. Other typical initialization parameters and algorithms may include a time duration for the warning alarms, a time increment value, a sensor scan routine, and both standby and wake up modes for processor 124, among others.

In step 304, a determination is made as to whether vehicle 102 is parked, and, typically, if the ignition is turned off. If that is not the case (No in step 304), the timekeeping function within processor 124 is reset (step 306) and the cycle is started again. If the vehicle is parked (Yes in step 304), collision avoidance system 100 is generally configured to be operative in a standby mode (step 308). In the exemplary embodiment, the standby mode may be activated automatically, or manually, or remotely. In the standby mode, exemplary system 100 is generally configured to operate at a reduced power level to conserve power source 108. This type of power reduction can be achieved, for example, by generating the ultrasonic pulses to sensors 104 at a relatively slow rate, e.g., at approximately one pulse every 2 seconds.

In step 310, processor 124 monitors the signals fed back by sensors 104, to determine which return signal, if any, represents the shortest distance between vehicle 202 and vehicle 102. In step 312, processor 124 determines whether or not the closest received signal is within the first boundary (204). If not (No in step 312), the timekeeping function within processor 124 is reset (step 306) and the cycle is started again. If vehicle 202 is within boundary 204 (Yes in step 312), processor 124 places system 100 in a wake up, or fully active, mode (step 314). In wake up mode, processor 124 typically activates a relatively high ultrasonic pulse rate, e.g., at approximately one pulse every second, in order to closely monitor the position of vehicle 202.

Step 316 represents a time out function of system 100. That is, a timekeeping function within processor 124 keeps track of how long vehicle 202 is within a distance boundary, but not changing position. Processor 124 may also be pre-programmed to ignore a certain degree of distance variation as part of the position change determination. For example, wind conditions might cause part of a stationary object (vehicle, parking meter, etc.) to move a small distance, such as a fraction of an inch. If the pre-programmed distance variation threshold is set at one inch, for example, processor 124 will consider any movement less than one inch to be effectively zero (no change in position).

If processor 124 determines that vehicle 202 has not changed position for a time duration that exceeds a predetermined time out limit, e.g., in an exemplary range of 30 to 60 seconds (Yes in step 316), the detection cycle is started again. If the time out limit is not exceeded (No in step 316), the timekeeping function is incremented, e.g., by 10 milliseconds (step 318), and a first alarm level is typically activated (step 320). As described previously, the first alarm level may take the form of activating tail lights 116 and/or headlights 118, or might be any other type of visual or audible action deemed appropriate.

In step 322, a determination is made as to whether or not vehicle 202 has approached vehicle 102 at a distance less than $D_2$ (second boundary 206). If not (No in step 322), the detection cycle is started again. If vehicle 202 is detected within boundary 206, a second alarm level is typically activated (step 324). The second alarm level is typically more intense than the first alarm level, and may take the form of flashing lights 116, 118 of vehicle 102 on and off, or increasing their intensity, or any other type of visual or audible action deemed appropriate.

Step 326 follows the same pattern as step 322, with respect to the third distance boundary 208. That is, if vehicle 202 approaches vehicle 102 at a distance less than $D_3$, a third alarm level is typically activated (step 328). The third alarm level is typically more intense than the second alarm level, and may take the form of blowing horn 120 of vehicle 102, in addition to flashing lights 116, 118. Horn 120 may be sounded intermittently, lights 116, 118 may be flashed more rapidly and/or may be increased in intensity, or any other type of visual and/or audible alarm may be activated, in order to provide an urgent warning to an approaching driver.

After step 328, the exemplary collision avoidance method continuously loops through the flow diagram steps described above until some action is taken to turn off the system. For example, system 100 might be inactivated by a remote signal, or by opening a door, or by starting up the ignition of vehicle 102, as well as by other measures.

Accordingly, the shortcomings of the prior art have been overcome by providing an improved collision avoidance system for an unattended parked vehicle. The unattended parked vehicle is typically provided with a distance sensing capability that surveys the area around the parked vehicle for approaching vehicles or other objects. If an approaching vehicle moves within a first predetermined distance from the parked vehicle, a first warning indicator is typically activated by the collision avoidance system within the parked vehicle to alert the driver of the approaching vehicle of an impending collision. If the approaching vehicle crosses successively closer predetermined distance boundaries with respect to the parked vehicle, the collision avoidance system within the parked vehicle typically generates increasingly intense types of warning signals. The exemplary collision avoidance system can typically be activated automatically, manually, or by remote control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of protecting an unattended parked vehicle from being impacted by a moving object, comprising the steps of:
   a) monitoring a plurality of concentric predetermined distance thresholds around the perimeter of the unattended parked vehicle;
   b) detecting the presence of the moving object within one of the plurality of concentric predetermined distance thresholds;
   c) activating an alarm of an alarm system when the moving object is detected within one of the plurality of concentric predetermined distance thresholds, the intensity of the alarm being dependent upon the distance between the moving object and the unattended parked vehicle.

2. The method of claim 1 wherein the monitoring step operates in a low power standby mode.

3. The method of claim 1 wherein the detecting step further comprises placing the monitoring step in a full power active mode when a moving object is detected within one of the plurality of concentric predetermined distance thresholds around the perimeter of the unattended parked vehicle.

4. The method of claim 3 wherein the activating step activates a first level of the alarm system when a moving object is detected within the outermost distance threshold.

5. The method of claim 4 wherein the first level of the alarm system comprises light signals.

6. The method of claim 5 wherein an intermediate level of the alarm system increases the intensity of the light signals.

7. The method of claim 3 wherein the activating step activates an intermediate level of the alarm system when a moving object is detected within a closer distance threshold than the outermost distance threshold.

8. The method of claim 7 wherein an intermediate level of the alarm system flashes the light signals on and off.

9. The method of claim 3 wherein the activating step activates a maximum level of the alarm system when a moving object is detected within the closest distance threshold around the perimeter of the unattended parked vehicle.

10. The method of claim 9 wherein the maximum level of the alarm system comprises an audible signal.

11. The method of claim 10 wherein the audible signal comprises blowing the horn of the unattended parked vehicle.

12. The method of claim 9 wherein the maximum level of the alarm system comprises a combination of light signals and audible signals.

13. The method of claim 1 wherein the alarm system is time limited.

14. The method of claim 1 wherein the alarm comprises a flashing light signal, and wherein the method further comprises the step of increasing the rate at which the flashing light signal flashes as the moving object moves toward the unattended vehicle.

15. The method of claim 1 wherein the alarm comprises an audible signal, and wherein the method further comprises the step of increasing the volume of the audible signal as the moving object moves toward the unattended vehicle.

16. A collision avoidance system for protecting an unattended parked vehicle from being impacted by a moving vehicle under the control of a driver, comprising:
   a detection apparatus within the unattended parked vehicle;
   a processor within the unattended parked vehicle; and
   an alarm system within the unattended parked vehicle, wherein the detection apparatus is configured to sense the presence of a moving vehicle within a predetermined threshold distance from the unattended parked vehicle, wherein the processor is configured to activate the alarm system to warn the driver of the moving vehicle when the detection apparatus indicates that the moving vehicle is within the predetermined threshold distance, and wherein the processor is configured to increase the intensity of the alarm as the moving vehicle approaches the unattended parked vehicle.

17. The collision avoidance system of claim 16 wherein the alarm system comprises light signals.

18. The collision avoidance system of claim 17 wherein the light signals flash on and off as the moving vehicle approaches the unattended parked vehicle.

19. The collision avoidance system of claim 16 wherein the alarm system comprises an audible signal.

20. The collision avoidance system of claim 19 wherein the audible signal comprises blowing the horn of the unattended parked vehicle as the moving vehicle approaches the unattended parked vehicle.

21. The collision avoidance system of claim 16 wherein the alarm system comprises a combination of light signals and audible signals.

22. The collision avoidance system of claim 16 wherein the alarm system is time limited.

23. The collision avoidance system of claim 16 wherein the detection apparatus comprises an ultrasonic distance detection system.

24. The collision avoidance system of claim 23 wherein the ultrasonic distance detection system comprises a plurality of sensors positioned on the exterior of the unattended parked vehicle.

25. The collision avoidance system of claim 23 wherein the ultrasonic distance detection system is first operated in a power conserving standby mode.

26. The collision avoidance system of claim 25 wherein the ultrasonic distance detection system is activated to a full power mode when a moving vehicle is detected within a predetermined threshold distance from the unattended parked vehicle.

* * * * *